Patented Jan. 8, 1946

2,392,454

UNITED STATES PATENT OFFICE 2,392,454

PREPARATION OF ISOBUTANE AND ETHYL CHLORIDE

Donald C. Bond, Northbrook, and Nelson B. Russell, Winnetka, Ill., assignors to The Pure Oil Company, Chicago, Ill., a corporation of Ohio No Drawing. Application April 23, 1943, Serial No. 484,312

14 Claims. (Cl. 260—663)

This invention relates to a method of preparing iso-paraffins from olefins and is more particularly concerned with a process of converting ethylene into iso-butane.

An object of the invention is to provide a method for preparing iso-paraffins from olefinic hydrocarbons.

Another object of the invention is to provide a method for converting ethylene into iso-butane.

Still another object of the invention is to provide a method for simultaneously preparing alkyl halides and iso-paraffins from olefinic hydrocarbons.

A still further object of the invention is to provide a process for simultaneously preparing ethyl chloride and iso-butane.

Other objects of the invention will make themselves apparent from the following description.

We have discovered that olefins can be converted into iso-paraffins by contacting the olefin with a Friedel-Crafts type catalyst in the presence of hydrogen chloride.

It is known to make ethyl chloride by reacting ethylene with hydrogen chloride in approximately equal volume ratio in the presence of aluminum chloride. Under proper conditions, in excess of 75% of the ethylene can be converted per pass into ethyl chloride in this manner.

We have discovered that under properly regulated conditions of temperature and olefin to hydrogen chloride ratio, large amounts of iso-butane can be prepared simultaneously with ethyl chloride and that iso-butane may constitute the major reaction product. In order to suppress the formation of ethyl chloride in favor of formation of iso-butane, it is necessary to keep the volume ratio of hydrogen chloride to ethylene down to less than 0.5. In order that iso-butane will form in appreciable quantities, the volume of hydrogen chloride to ethylene should be maintained above 0.15. We prefer, however, to keep the volume ratio between 0.2 and 0.4 since our research has shown that yields of iso-butane are largest within this range.

The reaction proceeds best at a temperature of approximately 300 to 350° F. although substantial yields of iso-butane may be obtained at temperatures as low as 250° F. The process may be carried out under atmospheric or superatmospheric pressure.

As catalyst for the reaction, we use a Friedel-Crafts type catalyst such as aluminum chloride or aluminum bromide. We prefer to use as catalyst aluminum halide impregnated on a solid carrier such as Activated Alumina, fuller's earth or active carbon. The reactants may be contacted with the catalyst for a period of time varying over a wide range. We have found in our research that a period of contact between reactants and catalyst of from 2 to 12 minutes, or stated differently, a space velocity of approximately 5 to 30 gives good results. By "space velocity" is meant the total volume at standard temperature and pressure of gas per hour passed through the catalyst divided by the volume occupied by the catalyst.

Instead of starting with aluminum halide as catalyst, aluminum halide-olefin complex may be used. We have found that in the initial stages of the reaction the catalyst is relatively inactive with respect to the formation of iso-butane and does not become active to any substantial degree until the olefin has been passed through catalyst for a sufficient period of time to form a complex therewith. Another factor that we have observed is that the halide catalyst is relatively inactive unless it is first soaked in an atmosphere of hydrogen chloride or has been contacted with hydrogen chloride for a sufficient period of time. Therefore, if fresh aluminum halide is used as catalyst, substantial yields of iso-butane are not obtained until ethylene and hydrogen chloride have been passed there-through for a considerable period of time. It is therefore advantageous to soak the catalyst in hydrogen chloride gas prior to beginning operations or to start with an ethylene-aluminum chloride complex or to do both.

The catalyst becomes deactivated during the course of use with the result that the yield of iso-butane decreases. The catalyst can be activated to some extent by soaking in an atmosphere of hydrogen chloride.

In order to demonstrate our invention, a series of runs were made on ethylene using as catalyst "Isocel," a commercial catalyst prepared by impregnating Activated Alumina with from 15 to 20% of anhydrous aluminum chloride. The results obtained on the runs are tabulated in the following table.

Table

| Run No. | Catalyst | Catalyst temp. of— | Vol. ratio HCl: C₂H₄ | Space velocity | Contact time in minutes | Duration of run in hrs. | Per cent yield of C₂H₅Cl on C₂H₄ | Per cent yield of C₂H₅Cl on HCl | Per cent yield of isobutane on C₂H₄ |
|---|---|---|---|---|---|---|---|---|---|
| 303-A-I | Fresh Isocel soaked 3 days in HCl | 300 | 0.64 | 18 | 3.3 | 5.25 | 2.9 | 4.6 | 8.5 |
| 303-C-I | Cat. from run 303-A-I after 7.75 hrs. running and soaked overnight in HCl gas. | 300 | 0.37 | 16 | 3.9 | 3.0 | 22.8 | 61.5 | 31.6 |
| 303-C-II | Same as used in 303-C-I | 300 | 0.37 | 16 | 3.9 | 2.42 | 47.1 | 127.0 | 23.6 |
| 303-D-I | Same as used in 303-C-II soaked overnight in HCl gas. | 300 | 0.19 | 13 | 4.6 | 3.0 | 33.1 | 174.0 | 20.2 |
| 303-D-II | Same as used in 303-D-I | 300 | 0.19 | 13 | 4.6 | 3.0 | 30.2 | 159.0 | 16.0 |
| 302-C-I | Isocel after being run for 9 hours and soaked for 2 days in HCl gas. | 300 | 0.89 | 21 | 2.9 | 3.5 | 67.0 | 75.0 | 18.4 |
| 304-A-I | Fresh Isocel soaked 1 day in HCl gas | 250 | 1.09 | 23 | 2.6 | 6 | 11.3 | 10.4 | 8.5 |
| 304-C-I | Isocel from 304-A-I after being run for 9.5 hrs. and soaked overnight in HCl gas. | 250 | 0.5 | 17 | 3.5 | 3 | 43.3 | 86.6 | 15.7 |
| 304-C-II | Same as used in 304-C-I | 250 | 0.5 | 17 | 3.5 | 2.25 | 47.6 | 95.2 | 14.6 |
| 304-D-I | Same as used in 304-C-I after soaking for 12 days in HCl gas. | 250 | 0.3 | 20 | 3.0 | 2.5 | 32.9 | 110.0 | 6.5 |
| 304-D-II | Same as used in 304-D-I | 250 | 0.3 | 20 | 3.0 | 2.5 | 25.0 | 83.5 | 5.3 |
| 304-B-II | Same as used in 304-A-I after 7.5 hrs. running | 250 | 1.05 | 23 | 2.6 | 2.0 | 60.4 | 57.5 | 8.9 |
| 303-E-II | Same as used in 303-D-II after intermediate run of 2 hrs. | 300 | 1.04 | 20 | 3.0 | 2.13 | 78 | 75 | 4.8 |

The yields obtained for run 303-A-I show that fresh "Isocel" has very low activity since the yield of iso-butane based on ethylene charged was only 8.5%. As shown in run 303-C-I, after the catalyst had been run for 7¾ hours, the yield of iso-butane jumped to 31.6%, exceeding the yield of ethyl chloride in the same run. Continued use of the catalyst, without reactivation by hydrogen chloride, causes the yield of iso-butane to decrease. This is shown by the results of runs 303-C-I and 303-C-II. Run 303-C-II was made with the catalyst from run 303-C-I without reactivation with hydrogen chloride. In these runs the experimental conditions were the same, except for the difference in catalysts, yet 31.6% iso-butane was obtained in run 303-C-I, against 23.6% in run 303-C-II. The same effect is shown by runs 303-D-I and 303-D-II, 304-C-I and 304-C-II, and 304-D-I and 304-D-II. The yields of ethyl chloride based on hydrogen chloride, in excess of 100%, are due to the fact that hydrogen chloride was occluded in the catalyst during the soaking and undoubtedly some of this hydrogen chloride reacted with ethylene.

The results of runs 303-C-I, 303-D-I and 303-E-II show the effect of changing the hydrogen chloride-ethylene ratio. In these runs the experimental conditions were approximately the same, except for the difference in hydrogen chloride-ethylene ratio. As this ratio varied from 0.19 to 0.37 to 1.04 the yield of iso-butane changed from 20.2% to 31.6% to 4.8%, respectively.

The remaining runs in the table were all made at 250° F. Run 304-A-I again demonstrates that fresh catalyst is relatively inactive. In run 304-C-I after the catalyst had been run for 9½ hours, the iso-butane yield increased to 15.7% and the ethyl chloride yield increased to 43.3%. Run 304-B-II shows the effect of using a high ratio of hydrogen chloride to ethylene although in this run the catalyst was in a high state of activity. The yield of iso-butane was only 8.9%, whereas the yield of ethyl chloride was 60.4%.

It is apparent from the foregoing table that the catalyst must be periodically renewed. The length of run will depend upon economic considerations, such as requirements of iso-butane and the market for ethyl chloride. In the course of the reaction, in addition to ethyl chloride and iso-butane, C₅ and higher boiling products, as well as hydrocarbons having less than 4 carbon atoms are formed to a lesser extent. These products can be separated from the iso-butane by fractionation.

The formation of iso-butane from ethylene can be explained by the fact that the catalyst forms an aluminum chloride-hydrocarbon complex containing less hydrogen than is contained in ethylene. Regardless of the theory accounting for the formation of iso-butane, we believe that we are the first to have discovered that iso-paraffins such as iso-butane can be obtained in large yields from olefins such as ethylene by contacting the olefin with a proper catalyst and promoting agent, as distinguished from processes involving alkylation of iso-paraffins by means of olefins or polymerization of olefins followed by hydrogenation. Our process does not require the use of either iso-paraffins or hydrogen.

We claim:

1. The method of preparing iso-paraffins which comprises contacting ethylene with a Friedel-Crafts type catalyst selected from the group consisting of aluminum chloride, aluminum bromide, and their ethylene complexes at a temperature of approximately 250°–350° F. in the presence of hydrogen chloride, the volume ratio of hydrogen chloride to ethylene being between 0.15 and 0.5.

2. The method in accordance with claim 1 in which the temperature is within the range of approximately 300° to 350° F.

3. The method in accordance with claim 1 in which the temperature is within the range of approximately 300° to 350° F. and the space velocity is within the range of 5 to 30.

4. The method of preparing iso-butane from ethylene which comprises contacting ethylene containing gas with substantially anhydrous aluminum chloride at temperatures of approximately 250° to 350° F. in the presence of hydrogen chloride, the volume ratio of hydrogen chloride to ethylene being between 0.15 and 0.5.

5. The method in accordance with claim 4 in which the temperature is approximately 300° to 350° F.

6. The method in accordance with claim 4 in which the temperature is approximately 300°–350° F. and the space velocity is approximately 5 to 30.

7. The method of preparing iso-butane and ethyl-chloride which comprises contacting a mixture of hydrogen chloride and ethylene in the ratio of approximately 0.15 to 0.50 volume of the former to one volume of the latter, with anhydrous aluminum chloride deposited on a porous carrier, at temperatures of approximately 250° to 350° F.

8. The method in accordance with claim 7 in which the carrier is Activated Alumina.

9. The method in accordance with claim 7 in which the catalyst is soaked in an atmosphere of hydrogen chloride prior to contacting it with the ethylene-hydrogen chloride mixture.

10. The method of preparing iso-butane and ethyl chloride which comprises contacting a mixture containing hydrogen chloride and ethylene in the ratio of 0.15 and 0.5 volume of the former to one volume of the latter with a catalyst comprising aluminum chloride on Activated Alumina, at a temperature of approximately 300° to 350° F.

11. The method in accordance with claim 10 in which the catalyst is soaked in hydrogen chloride prior to contacting it with the ethylene-containing mixture.

12. The method of preparing iso-butane and ethyl chloride which comprises contacting a mixture containing hydrogen chloride and ethylene in the ratio of 0.15 and 0.5 volume of the former to one volume of the latter, with an aluminum chloride-ethylene complex at temperatures between approximately 250° and 350° F.

13. The method in accordance with claim 12 in which the complex is soaked in hydrogen chloride prior to contact with the ethylene-hydrogen chloride mixture.

14. The method in accordance with claim 10 in which the ratio is approximately 0.2 and 0.4 volume of hydrogen chloride to one volume of ethylene.

DONALD C. BOND.
NELSON B. RUSSELL.